United States Patent
Nicolas

(10) Patent No.: US 7,487,364 B2
(45) Date of Patent: Feb. 3, 2009

(54) METHOD TO STORE ENCRYPTED DATA

(75) Inventor: Christophe Nicolas, Preverenges (CH)

(73) Assignee: Nagracard S.A., Cheseaux-Sur-Lausanne (CH)

( * ) Notice: Subject to any disclaimer, the term of this patent is extended or adjusted under 35 U.S.C. 154(b) by 748 days.

(21) Appl. No.: 10/297,723

(22) PCT Filed: Jan. 15, 2002

(86) PCT No.: PCT/IB02/00106

§ 371 (c)(1),
(2), (4) Date: Dec. 9, 2002

(87) PCT Pub. No.: WO02/056592

PCT Pub. Date: Jul. 18, 2002

(65) Prior Publication Data

US 2003/0179881 A1 Sep. 25, 2003

(30) Foreign Application Priority Data

Jan. 16, 2001 (CH) .................................. 0061/01

(51) Int. Cl.
G06F 11/30 (2006.01)
G06F 7/04 (2006.01)
H04L 9/00 (2006.01)
H04L 9/28 (2006.01)
H04N 7/16 (2006.01)
H04N 7/173 (2006.01)
H04H 60/32 (2008.01)

(52) U.S. Cl. .......................... 713/193; 713/168; 726/33; 725/2; 725/20; 725/100; 380/28; 380/229

(58) Field of Classification Search .............. 725/25–31, 725/2, 20, 100; 380/239, 28, 229; 713/193, 713/189, 168; 726/33
See application file for complete search history.

(56) References Cited

U.S. PATENT DOCUMENTS

| | | | | |
|---|---|---|---|---|
| 4,302,810 A | * | 11/1981 | Bouricius et al. | 705/75 |
| 5,008,936 A | * | 4/1991 | Hamilton et al. | 380/281 |
| 5,224,166 A | * | 6/1993 | Hartman, Jr. | 713/190 |
| 5,353,351 A | * | 10/1994 | Bartoli et al. | 380/33 |
| 5,504,816 A | * | 4/1996 | Hamilton et al. | 380/217 |
| 5,757,909 A | * | 5/1998 | Park | 380/201 |
| 5,915,025 A | * | 6/1999 | Taguchi et al. | 380/44 |
| 6,144,744 A | * | 11/2000 | Smith et al. | 380/45 |

(Continued)

FOREIGN PATENT DOCUMENTS

EP 0 809 402 11/1997

(Continued)

Primary Examiner—Nasser G Moazzami
Assistant Examiner—Mohammad W Reza
(74) Attorney, Agent, or Firm—DLA Piper LLP (US)

(57) ABSTRACT

The objective of the present invention is to propose a method to prevent that the decryption of a keys file of a group of data stored in a storing unit (DB) of a decoder (STB), the latter comprising a security module (SM), allows many bad intentioned users to benefit illegally from this product.

This method consists in extracting from an encrypted data flux the data to send towards the storing unit (DB) and to re-encrypt the data before transferring them to the storing unit (DB) by at least one specific key (K1, K2).

14 Claims, 1 Drawing Sheet

U.S. PATENT DOCUMENTS

| | | | |
|---|---|---|---|
| 6,195,751 B1 * | 2/2001 | Caronni et al. | 713/163 |
| 6,393,128 B1 * | 5/2002 | Rix et al. | 380/283 |
| 6,550,011 B1 * | 4/2003 | Sims, III | 713/193 |
| 6,636,966 B1 * | 10/2003 | Lee et al. | 713/165 |
| 6,853,728 B1 * | 2/2005 | Kahn et al. | 380/239 |
| 6,859,533 B1 * | 2/2005 | Wang et al. | 380/28 |
| 6,937,726 B1 * | 8/2005 | Wang | 380/30 |
| 6,941,454 B1 * | 9/2005 | Spraggs | 713/150 |
| 6,957,340 B1 * | 10/2005 | Pang et al. | 713/189 |
| 7,039,816 B2 * | 5/2006 | Kocher et al. | 713/194 |
| 7,069,579 B2 * | 6/2006 | Delpuch | 725/135 |
| 7,093,277 B2 * | 8/2006 | Perlman | 725/142 |
| 7,093,295 B1 * | 8/2006 | Saito | 726/26 |
| 7,181,129 B2 * | 2/2007 | Saito | 386/94 |
| 2002/0019932 A1 * | 2/2002 | Toh et al. | 713/155 |
| 2002/0091935 A1 * | 7/2002 | Smith et al. | 713/189 |
| 2002/0184648 A1 * | 12/2002 | Delpuch | 725/112 |
| 2002/0184684 P1 * | 12/2002 | Pieters | |
| 2003/0208771 A1 * | 11/2003 | Hensgen et al. | 725/100 |

FOREIGN PATENT DOCUMENTS

| | | |
|---|---|---|
| EP | 0 912 052 | 4/1999 |
| EP | 1 122 910 | 8/2001 |
| FR | 2 732 537 | 10/1996 |
| WO | WO 00 22777 | 4/2000 |

\* cited by examiner

METHOD TO STORE ENCRYPTED DATA

FIELD OF THE INVENTION

The present invention concerns the encryption of data, particularly the transmission of encrypted data on open networks.

BACKGROUND OF THE INVENTION

When we want to guarantee that only the authorised addresses can exploit the data transmitted on open networks (cable, satellite, terrestrial broadcast, or Internet), the most appropriate means is to encrypt these data and to ensure that only the authorised addressees have the means for decrypting them.

Despite known encryption algorithms, it is admitted that it is possible for a third person with significant computing power to decrypt these data.

This is why the known systems integrate a frequent key changing mechanism that discourages potential assailants. Each attack then only acts on a small portion of data and only allows access, after decryption, to a few seconds of transmission.

This method is used for the broadcasting of pay television, wherein the key is called the "control word" and only has a duration of a few seconds. These data are referred to as "for immediate consumption" and the corresponding key is sent in parallel.

The appearance of storing means (e.g., digital video recorders) and the possibility of viewing (or exploiting) these data at any given moment has modified the situation somewhat.

In order to further satisfy clients it is now possible to send encrypted data on a distribution network comprising a great number of users. These data are stored in the storage unit of the user unit. These data are accompanied by a file containing the encryption keys, this file also being encrypted according to an algorithm and keys contained in a security module of the user. This security module generally is in the form of a smart card having in its memory its own keys to decrypt the data.

For the following discussion the data defining the product subject to conditional access will be referred to as "product data". "Product data" means content such as a film, a sports broadcast, a game, or software.

We will consider the fact that a great number of user units contain in their storage unit the same "product data" and a file of keys.

If the user decides to buy this product, the security module will receive the necessary instructions to decrypt the keys file and to supply in useful time the keys to decrypt the "product data".

An ill-intentioned third person will then attack the keys file that is encrypted by the specific key while the "product data" are encrypted by a great number of keys.

Furthermore, the size of the keys file is small compared with the size of the product data. For information purposes, the size of a film in encrypted form may be about 1 Gigabyte; in decrypted and decompressed form the same can represent a size of 10 Gigabytes.

In this way, when this third person manages to decrypt the keys file this information can circulate easily on the Internet for example, thereby allowing other persons by means of a modified decoder to decrypt the "product data".

It should be understood that the decoder receives a stream of data whose format depends upon the broadcaster. This means that it is very difficult to isolate the different packages of information to obtain the "product data" in encrypted form at this stage. This is why the attack is made on the storing unit or hard disk, which for economic reasons is of a standard type (IDE for example). This disk is then transferred to a personal computer to receive by other channels the keys file.

In the similar objective of allowing the storing of a product on a hard disk and of viewing it later, a first approach is described in the document FR 2 732 537. The problem that this document seeks to solve is the duration of limited validity of the keys transmitted with the data. This is why the proposed solution is to decrypt the file containing the keys (CW) and to re-encrypt them with a local key to allow thus the use of the data at any time. It should be noted that the data in themselves are stored in the same state as when they entered the decoder.

The embodiment described in the document EP 0 912 052 varies in the sense that the local re-encryption key is stored in a smart card.

These two documents do not allow to solve the problem of the vulnerability of the data when they are stored on a storage device with easy access.

SUMMARY OF THE INVENTION

An objective of the present invention is to prevent the decryption of a keys file or of data from allowing ill-intentioned users to benefit illegally from "product data".

This objective is achieved by a storing method for data extracted from an encrypted data stream sent to a decoder connected to a security module and to a storing unit (DB), the method consisting of re-encrypting the encrypted data before they are transferred to the storing unit (DB) by at least one specific key (K1, K2).

In this way, the data of each storing unit are specific to the considered decoder and the decryption of a keys file only allows decryption of the "product data".

The data stream entering the decoder is firstly interpreted to isolate the parts that constitute the "product data". These are encrypted by a first key that is contained in the decoder.

Because of the fact that the decoder is not considered secure it is possible to use instead of or in additional to the first key, a key contained in a security module.

BRIEF DESCRIPTION OF THE DRAWINGS

The present invention will be better understood with the help of the annexed figures, taken as a non-limiting example, in which.

DETAILED DESCRIPTION OF THE INVENTION

Figure 1:
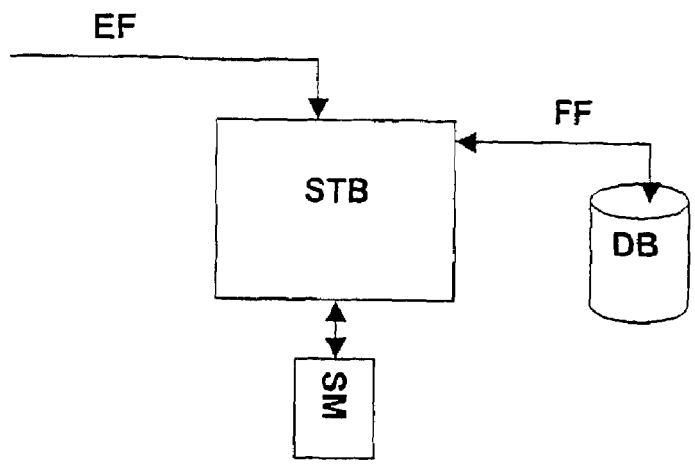
FIG. 1 illustrates the different components of a decoder.

FIG. 1 illustrates the stream entering EF in the decoder STB for processing. The data that are to be stored are isolated according to the format specific to the data destined for storage and sent to an encryption module before being transferred. This module uses the key K1 supplied by the security module SM, generally in the form of a smart card connected to the decoder. This card is considered to be secure and the different exchanges between the card and the decoder STB are encrypted by a key specific to these two elements. From then on it is not possible to read the information exchanged to feed a modified decoder for example. Once the data are encrypted they are transmitted by the channel FF to the storing unit DB.

The key K1 delivered by the security module SM can be combined with a second key K2 specific to the decoder. From this fact the deviation of the security module SM with the content of the data stored DB does not allow the decryption of these data.

These keys are specific, that is, each decoder or security module uses a different key. Depending on the chosen generation mode this key is generated randomly during an initialisation phase or is sent by the operating centre of the system.

Figure 2:
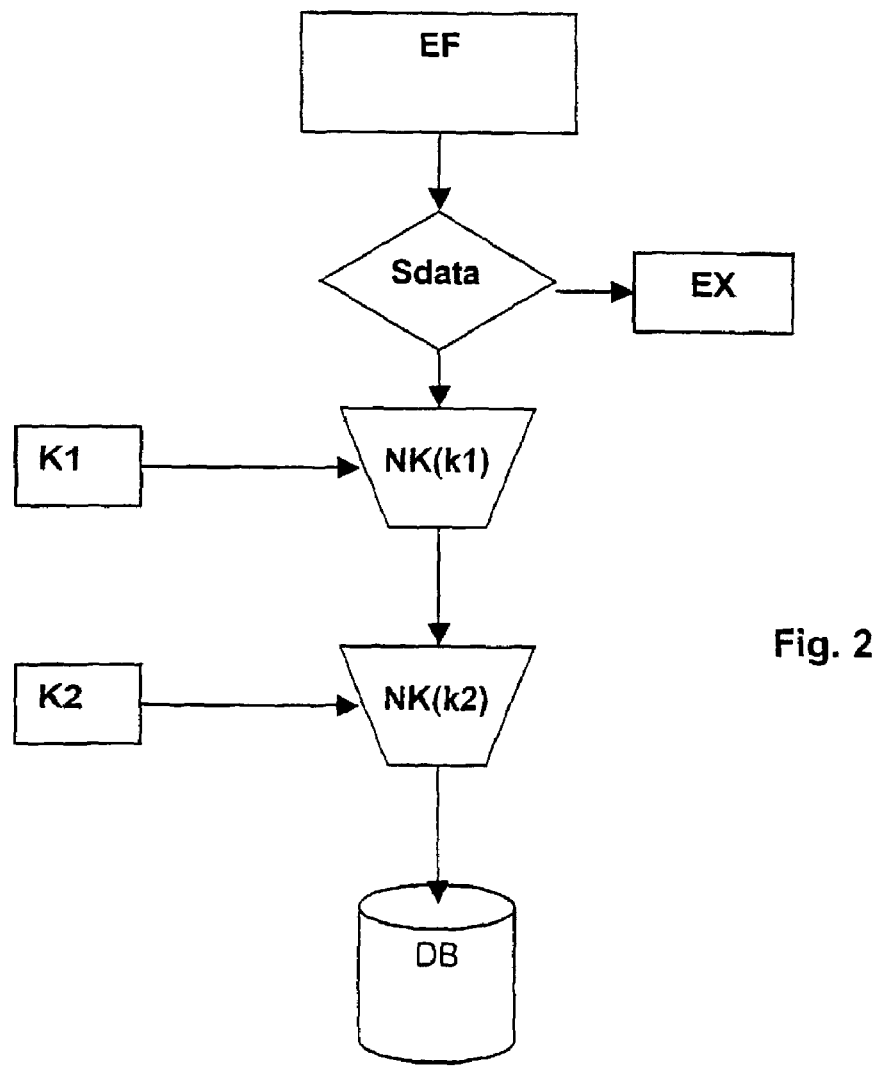
FIG. 2 illustrates the operations according to the invention.

FIG. 2 represents in the form of a diagram the same processing with the entering stream EF that passes through a first filter Sdata. This filter isolates the data destined for storage; the data serving other aims are directed to other processing by the output EX.

A first stage of encryption NK(K1) is then accomplished with a first key K1 coming from the security module SM. These data are then sent to a second encryption module NK(K2) fed by a second key K2 coming from the decoder STB.

These keys supplied by the decoder STB and the security module SM are used in any given order.

According to one embodiment, the encryption module is placed directly in the interface between the decoder and the storing module. In this way it is at a low logical level that this encryption is carried out independently of the central management software of the decoder.

According to another embodiment the security module SM has encryption means powerful enough to receive the data stream to be encrypted and to return the data in encrypted form. In this case it is the security module SM only that contains and uses the encryption key.

The encryption of the data can be executed a first time on the base of a first key K1 coming from the security module SM then on the base of a second key K2 coming from the decoder STB. Furthermore, according to the capacities of the storing module the latter can also supply a key K3 allowing to encrypt the data with this key.

It will then be necessary to collect these three elements so that the decryption is possible.

This principle can be understood for all the elements capable of storing their own key, this key then being used by a new encryption layer of data.

In most cases the use of stored data according to the method described above is subject to obtaining a right also known as an entitlement. This right is obtained from the operating centre and can be acquired before or after the downloading of the "product data". This right contains a product descriptor and a decryption key for the control words.

According to the invention at least one stage of the encryption is subject to a key contained in the security module (SM) where there are also the rights for the use of the data. During the decryption operation of the stored data on the storage means, the key K1 is only supplied to the decryption module if the verification of the right of use is positive. In this way the data DB will only recover their original encrypted form if the user has the right of use.

According to this embodiment the data DB are accompanied by a descriptor in plain text describing the necessary rights for these data. The security module SM, before decryption with the key K1, verifies this information with that contained in its secured memory.

The invention claimed is:

1. A method for storing encrypted broadcast data comprising the steps of:
    extracting, at a device comprising a decoder connected to a security module and a storage unit, encrypted data from a broadcast data stream, the encrypted data including encrypted audio data and encrypted video data;
    generating an encryption key by combining a first key provided by and unique to the decoder and a second key provided by and unique to the security module;
    re-encrypting the encrypted audio and video data using the encryption key to produce re-encrypted audio and video data;
    transferring the re-encrypted audio and video data to the storage unit.

2. The method of claim 1, wherein the first key is stored in the storage unit.

3. The method of claim 1, wherein the re-encrypting step is performed in the security module.

4. The method of claim 1, wherein the re-encrypting step is performed in a low level interface located between the storage unit and the decoder.

5. The method of claim 1, wherein the encrypted data extracted from the broadcast data stream includes a plurality of keys, each of the plurality of keys being operable to decrypt a portion of the encrypted audio data and the encrypted video data.

6. The method of claim 1, wherein the storage unit includes a storage medium that is non-removable.

7. The method of claim 6, wherein the storage unit is a hard disk.

8. The method of claim 1, further comprising the step of decrypting the data stored on the storage unit, wherein the decrypting step is performed in a low level interface located between the storage unit and the decoder.

9. The method of claim 1, wherein the re-encrypting step is performed in the decoder.

10. The method of claim 1, wherein the security module is a physical device that includes a processor and a memory separate from the decoder and the storage unit.

11. The method of claim 10, wherein the security module is a smart card.

12. The method of claim 1, further comprising the step of re-encrypting the re-encrypted data using a third key.

13. A device for receiving and storing data comprising:
    a decoder, the decoder including a first processor;
    a security module connected to the decoder, the security module including a second processor; and
    a storage unit connected to the decoder;
    wherein the device is configured to perform the steps of:
        extracting at the decoder encrypted data from a broadcast data stream, the encrypted data including audio and video data;
        generating an encryption key by combining a first key provided by and unique to the decoder and a second key provided by and unique to the security module;
        securely re-encrypting the encrypted audio and video data using the encryption key to produce re-encrypted data; and
        transferring the re-encrypted data to the storage unit.

14. The system of claim 13, wherein the security module is a smart card.

* * * * *